(12) United States Patent
Yang

(10) Patent No.: US 8,786,470 B2
(45) Date of Patent: Jul. 22, 2014

(54) WIRELESS KEYBOARD AND COMPUTER SYSTEM USING THE SAME

(75) Inventor: Song-Ling Yang, Shenzhen (CN)

(73) Assignees: Hong Fu Jin Precision Industry (ShenZhen) Co., Ltd., Shenzhen (CN); Hon Hai Precision Industry Co., Ltd., New Taipei (TW)

( * ) Notice: Subject to any disclaimer, the term of this patent is extended or adjusted under 35 U.S.C. 154(b) by 449 days.

(21) Appl. No.: 13/217,298

(22) Filed: Aug. 25, 2011

(65) Prior Publication Data
US 2012/0326897 A1    Dec. 27, 2012

(30) Foreign Application Priority Data
Jun. 24, 2011    (CN) .......................... 2011 1 0173807

(51) Int. Cl.
*H03M 11/00*    (2006.01)
*G06F 3/023*    (2006.01)
(52) U.S. Cl.
CPC .................................... *G06F 3/0231* (2013.01)
USPC ............................................ 341/26; 345/168
(58) Field of Classification Search
CPC ....... G06F 3/0231; G06F 3/0238; G06F 3/02; G06F 3/0202; H03K 17/94
USPC .................................. 341/20, 22, 26; 345/168
See application file for complete search history.

(56) References Cited

U.S. PATENT DOCUMENTS

| | | | | |
|---|---|---|---|---|
| 6,285,295 B1* | 9/2001 | Casden | ...................... | 340/12.24 |
| 6,531,964 B1* | 3/2003 | Loving | ....................... | 340/12.51 |
| 6,828,902 B2* | 12/2004 | Casden | ....................... | 340/10.3 |
| 7,006,014 B1* | 2/2006 | Henty | ............... | 341/22 |
| 7,084,787 B2* | 8/2006 | Olodort et al. | .................. | 341/22 |
| 7,525,453 B2* | 4/2009 | Henty | ............... | 341/22 |
| 7,621,690 B2* | 11/2009 | Anderson | ..................... | 403/329 |
| 8,089,376 B2* | 1/2012 | Oberle | ........................... | 341/22 |
| 8,525,648 B1* | 9/2013 | Henty | ......................... | 340/10.3 |
| 2005/0237295 A1* | 10/2005 | Anderson | ..................... | 345/156 |

* cited by examiner

*Primary Examiner* — Brian Zimmerman
*Assistant Examiner* — Sara Samson
(74) *Attorney, Agent, or Firm* — Novak Druce Connolly Bove + Quigg LLP

(57) ABSTRACT

A computer system includes a wireless keyboard, a reader, and a computer. The wireless keyboard includes an antenna, an array of keys, a storage unit, a scanning unit, and a processing unit. The keys in the array are associated with tags. The storage unit stores a content of a pair of tags of each key. The scanning unit scans the keys to determine when one or more keys are pressed. When one or more keys are pressed, the processing unit acquires the tag content corresponding to each of the one or more keys and sends the content to the reader.

8 Claims, 3 Drawing Sheets

WIRELESS KEYBOARD AND COMPUTER SYSTEM USING THE SAME

BACKGROUND

1. Technical Field

The disclosure relates to a computer system and, more particularly, to a wireless keyboard and a computer system with the wireless keyboard.

2. Description of Related Art

Wireless keyboards work on battery power. It can be very inconvenient to a user if the battery runs low during an important task and a new battery is not readily available.

Therefore, what is needed is a wireless keyboard to overcome the described shortcoming.

DETAILED DESCRIPTION

Figure 1:
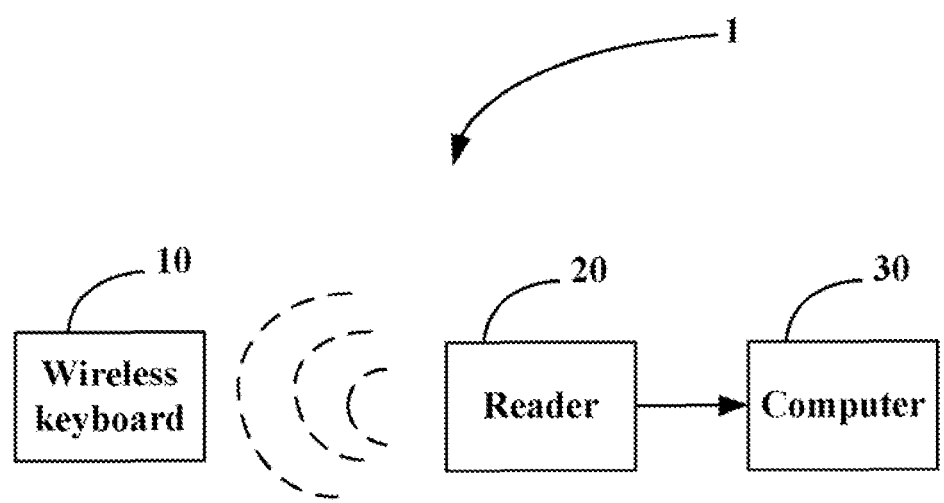
FIG. 1 is a schematic diagram of a computer system with a wireless keyboard, in accordance with an exemplary embodiment.

FIG. 1 is a schematic diagram of a computer system with a wireless keyboard, in accordance with an exemplary embodiment. The computer system 1 includes a wireless keyboard 10, a reader 20, and a computer 30. Components of the computer system 1 irrelevant to the disclosure are not shown in drawings, such as a mouse. The reader 20 is connected to the computer 30 via a peripheral interface (not shown), such as a USB interface. In another embodiment, the reader 20 is installed into the computer 30.

Figure 2:
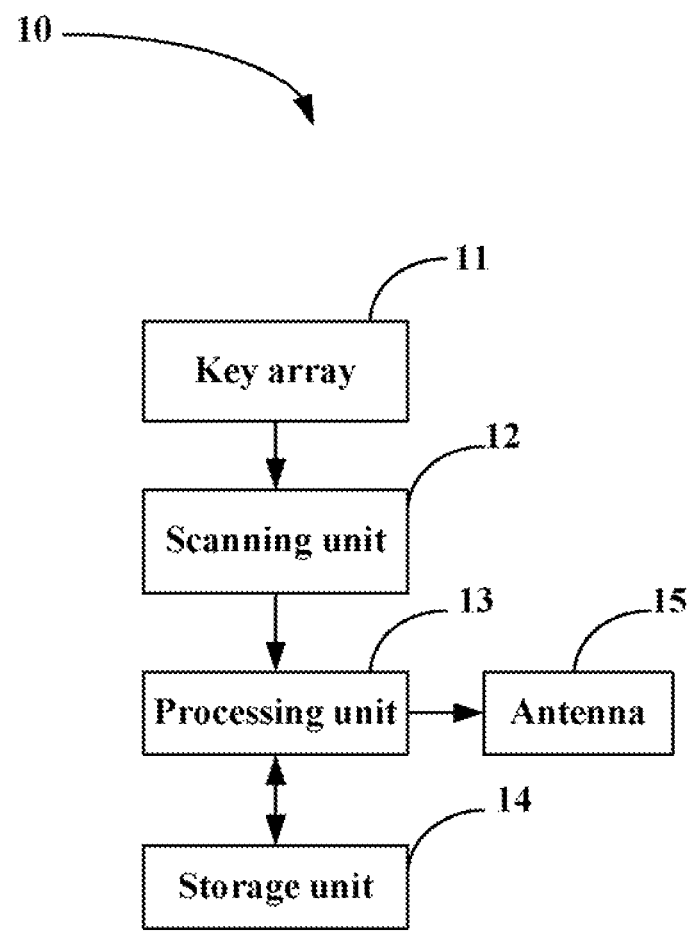
FIG. 2 is a block diagram of the wireless keyboard of FIG. 1.

As shown in FIG. 2, the wireless keyboard 10 includes a key array 11, a scanning unit 12, a processing unit 13, a storage unit 14, and an antenna 15. When a distance between the wireless keyboard 10 and the reader 20 is within a predetermined coverage area, a magnetic field is formed between the antenna 15 of the wireless keyboard 10 and the reader 20, and the reader 20 transmits a special frequency magnetic energy to the antenna 15. The antenna 15 receives the special frequency magnetic energy by electromagnetic induction and converts the energy to an electric current to power the wireless keyboard 10. The reader 20 receives and reads wireless signals from the wireless keyboard 10 and the computer 30 processes the signals. In the embodiment, the antenna 15 is a coil coupled antenna.

Therefore, in the course of wireless transmission between the wireless keyboard 10 and the reader 20, the wireless keyboard 10 obtains energy by virtue of induction current from the magnetic field to operate, and no battery is needed for the wireless keyboard 10.

Figure 3:
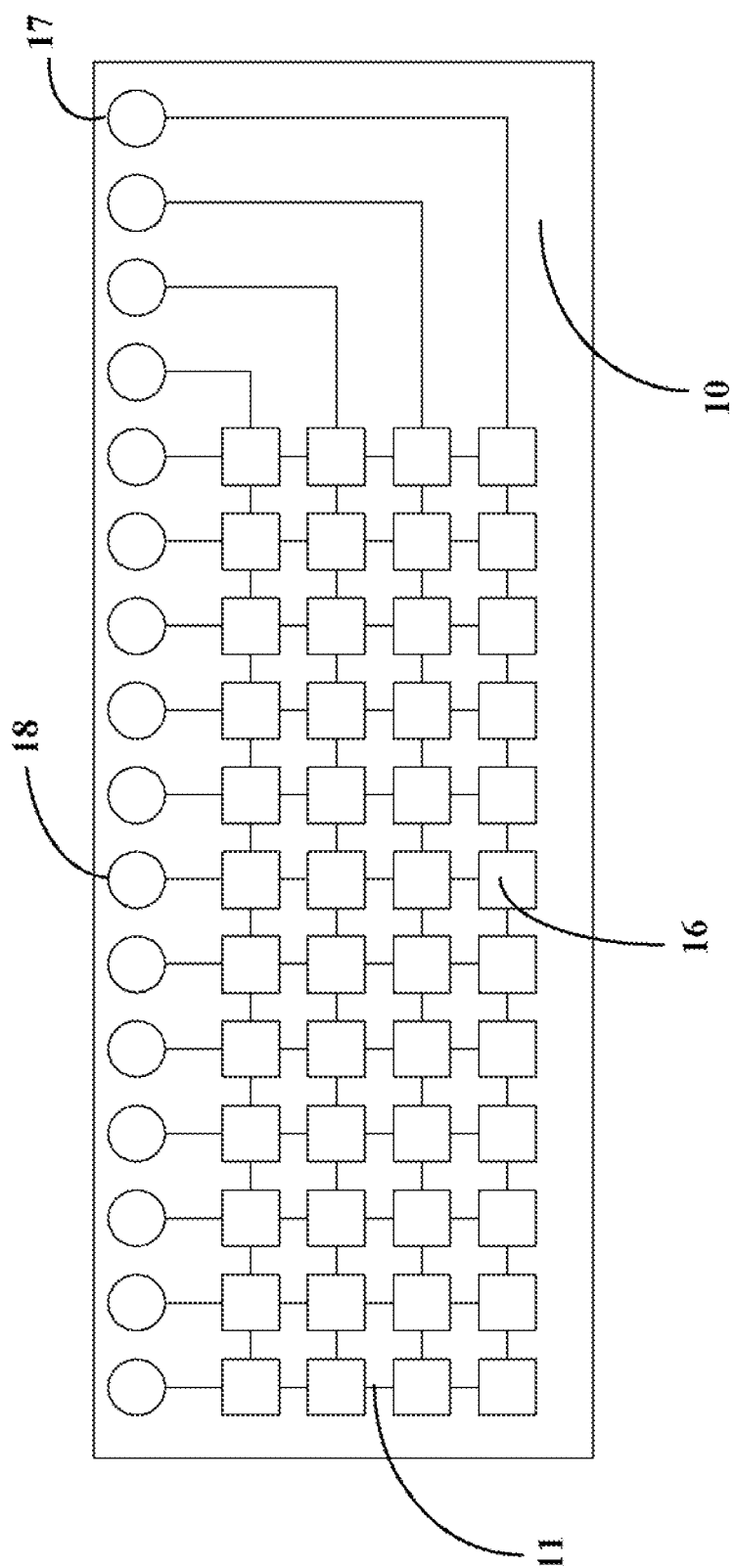
FIG. 3 is a schematic diagram of a key array of the wireless keyboard of FIG. 2.

Referring to FIG. 3, the wireless keyboard 10 defines a plurality of keys. All keys are arrayed in a matrix manner to form the key array 11. The key array 11 is arranged with a number of tags. Each of the number of tags is connected to a row or a column of the keys. Each key of the plurality of keys is connected to a first tag connected to a corresponding row the key belongs to (hereinafter, a row tag) and a second tag connected to a corresponding column the key belongs to (hereinafter, a column tag). For example, one key 16 of the plurality of keys is connected to a row tag 17 and a column tag 18 (hereinafter, a pair of tags) in the key array 11. The storage unit 14 is to store a content of each pair of tags (hereinafter, a tag content) corresponding to the key. The tag content records key information. The scanning unit 12 is to scan all keys in real time and determine whether one or more keys of the keys are pressed.

When one or more keys are pressed, the scanning unit 12 reads signals from a pair of tags corresponding to each of the one or more keys and generates a scanning signal. The processing unit 13 is to acquire the tag content of each of the one or more keys from the storage unit 14 according to the scanning signal and sends the tag content of each of the one or more keys as a radio signal via the antenna 15. The reader 20 receives and reads the tag content of each of the one or more keys and the computer 30 processes the tag content and performs a function corresponding to the one or more keys.

For example, when the scanning unit 12 determines that the key "F2" is pressed, the scanning unit 12 reads signals from the row tag and the column tag of the key "F2" and generates the scanning signal, the processing unit 13 acquires the tag content of the key "F2" from the storage unit 14 according to the scanning signal, and the reader 20 receives and reads the tag content of the key "F2" and the computer 30 processes the tag content and performs a function corresponding to the key "F2".

When the keys "Ctrl" and "V" are pressed at the same time, the scanning unit 12 reads signals from the row tags and the column tags of the keys "Ctrl" and "V" and generates the scanning signal, the processing unit 13 acquires the tag contents of the keys "Ctrl" and "V" from the storage unit 14 according to the scanning signal, and the reader 20 receives and reads the tag contents of the keys "Ctrl" and "V" and the computer 30 processes the tag contents and performs a function corresponding to the keys "Ctrl" and "V".

In another embodiment, the storage unit 14 is divided into a number of storage partitions in a predetermined manner. Each key of the plurality of keys 16 is connected to one storage partition and each storage partition is to store a tag content of the key. When one key of the keys is pressed, the scanning unit 12 reads the key and generates one signal. The processing unit 13 acquires the tag content of the key from a storage partition corresponding to the key in the storage unit 14 according to the signal and sends the tag content as a radio signal via the antenna 15. The reader 20 receives the tag content and the computer 30 processes the tag content and performs a function corresponding to the key.

When more keys of the keys are pressed, the keyboard scanning unit 12 reads the predetermined number of keys and generates more signals. The processing unit 13 acquires the predetermined number of tag contents of the predetermined number of keys from storage partitions in the storage unit 14 according to the signals and sends the predetermined number of tag contents as radio signals via the antenna 15. The reader 20 receives the predetermined number of tag contents and the computer 30 processes the predetermined number of tag contents and performs a function corresponding to the predetermined number of keys.

Although the present disclosure has been specifically described on the basis of the exemplary embodiment thereof, the disclosure is not to be construed as being limited thereto. Various changes or modifications may be made to the embodiment without departing from the scope and spirit of the disclosure.

What is claimed is:

1. A wireless keyboard comprising:
   an antenna;
   a key array, comprising a plurality of keys arranged in a matrix manner and a plurality of tags each connected to a row or a column of the keys, and each of the keys connected to a first and a second tags respectively connected to a corresponding row and a corresponding column the key belongs to;

a storage unit to store a tag content of each key associated with the first tag and the second tag;

a scanning unit to scan all keys in real time and determine whether one or more keys of the keys are pressed, and when one or more keys are pressed, to read signals from the first tag connected to the corresponding row and the second tag connected to the corresponding column of each of the one or more keys and generate a scanning signal; and a processing unit to acquire a tag content corresponding to each of the one or more keys from the storage unit according to the scanning signal and send the tag content of each of the one or more keys as a radio signal via the antenna.

2. The wireless keyboard as recited in claim 1, wherein the antenna is a coil coupled antenna.

3. The wireless keyboard as recited in claim 1, wherein the storage unit is divided into a plurality of storage partitions and each key is connected to one storage partition, and each storage partition is to store the tag content of the key.

4. A computer system comprising:
a computer;
a reader; and
a wireless keyboard further comprising:
an antenna;
a key array, comprising a plurality of keys arranged in a matrix manner and a plurality of tags each connected to a row or a column of the keys, and each of the keys connected to a first and a second tags respectively connected to a corresponding row and a corresponding column the key belongs to;

a storage unit to store a tag content of each key associated with the first tag and the second tag;

a scanning unit to scan all keys in real time and determine whether one or more of the keys are pressed, and when one or more keys are pressed, to read signals from the first tag connected to the corresponding row and the second tag connected to the corresponding column of each of the one or more keys and generate a scanning signal; and a processing unit to acquire a tag content corresponding to each of the one or more keys from the storage unit according to the scanning signal and send the tag content of each of the one or more keys as a radio signal via the antenna;

wherein the reader receives the tag content of each of the one or more keys and the computer processes the tag content and performs a function corresponding to the key.

5. The computer as recited in claim 4, wherein the antenna is a coil coupled antenna.

6. The computer as recited in claim 4, wherein the storage unit is divided into a plurality of storage partitions and each key is connected to one storage partition, and each storage partition is to store the tag content of the key.

7. The computer as recited in claim 4, wherein the reader is connected to the computer via a peripheral interface.

8. The computer as recited in claim 4, wherein the reader is installed into the computer.

* * * * *